June 10, 1958 A. W. ANDERSON 2,837,978
SHEET FEEDING AND CUTTING MECHANISM
Filed April 18, 1955 5 Sheets-Sheet 1

INVENTOR.
ANDREW W. ANDERSON
BY
Luther W. Hawley
ATTORNEY

June 10, 1958 A. W. ANDERSON 2,837,978
SHEET FEEDING AND CUTTING MECHANISM
Filed April 18, 1955 5 Sheets-Sheet 3

INVENTOR.
ANDREW W. ANDERSON
BY
Arthur W Hawley
ATTORNEY

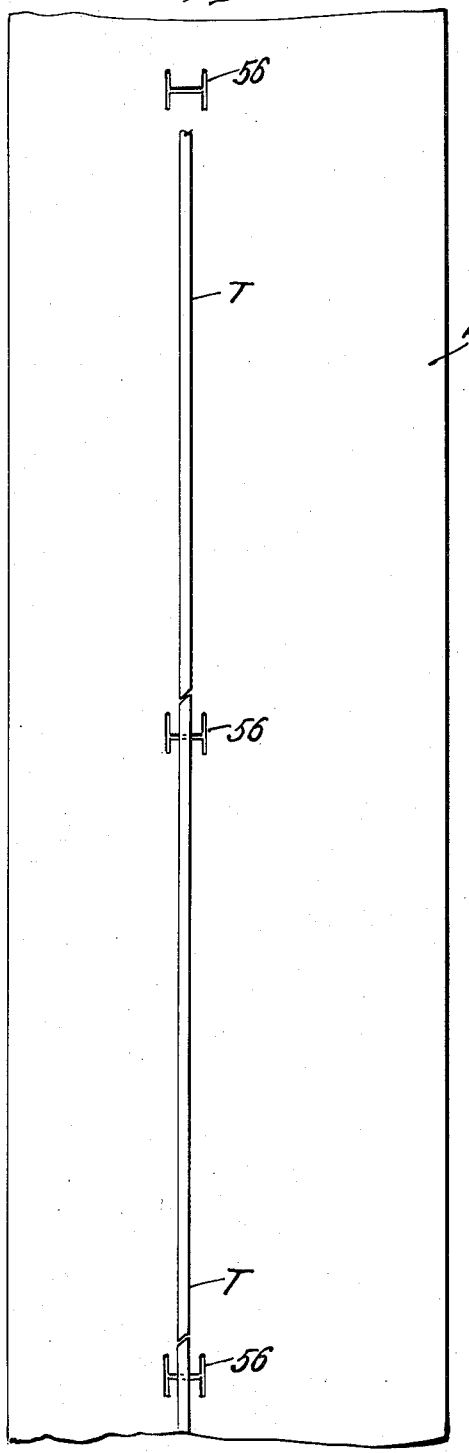
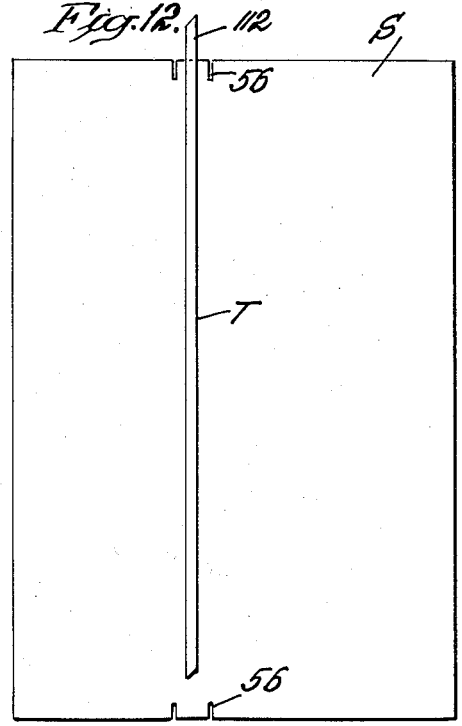
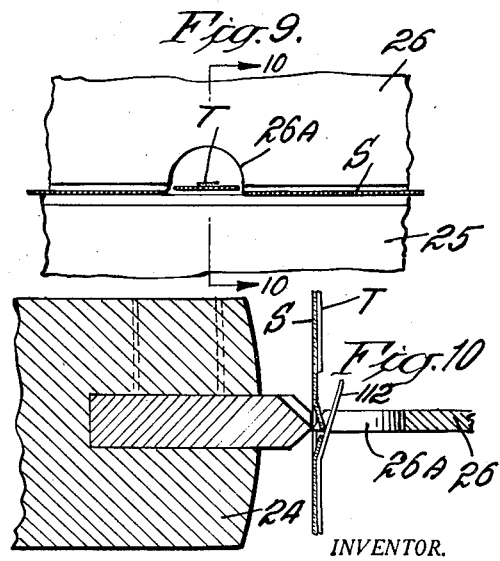

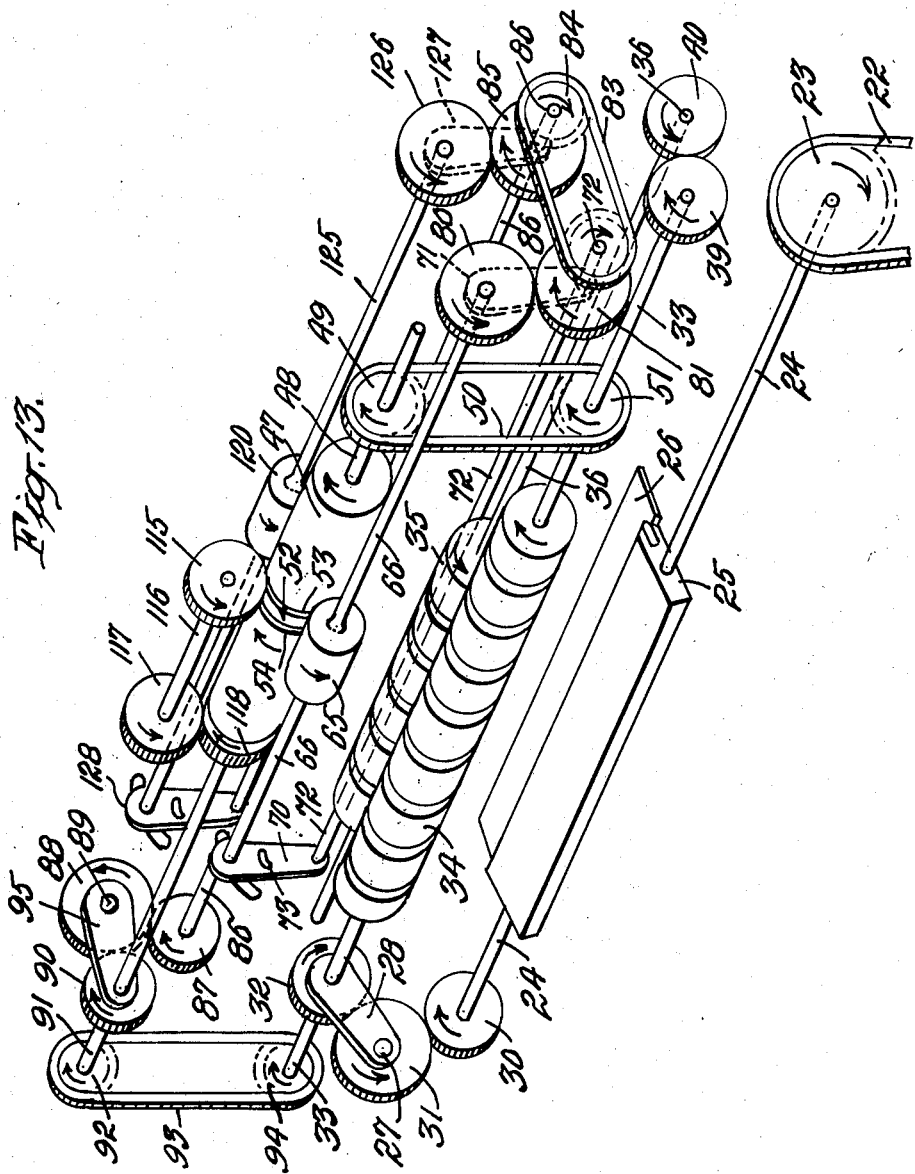

United States Patent Office 2,837,978
Patented June 10, 1958

2,837,978

SHEET FEEDING AND CUTTING MECHANISM

Andrew W. Anderson, Nutley, N. J., assignor to Scandia Manufacturing Co., North Arlington, N. J., a corporation of New Jersey Application April 18, 1955, Serial No. 501,819

2 Claims. (Cl. 93—1)

This invention relates to web and tape feeding and cutting mechanism.

More particularly stated, the invention relates to mechanism for feeding a web or strip of wrapping material, such as paper, and superposing thereon a tear tape and cutting the strip and tear tape into the desired length for wrapping operations.

The invention has for its salient object to provide mechanism of the character described so constructed that it can be readily adjusted to vary the length of the sheet cut from the strip and correspondingly vary the length of the tear strip or tape.

Further objects of the invention will appear from the following specification taken in connection with the drawings which form a part of this application, and in which Fig. 1 is a front elevation of a machine constructed in accordance with the invention;

Fig. 5 is a fragmentary view showing the knife holder for making an H cut in the strip of wrapping material;

Fig. 6 is a sectional elevation of the knife holder shown in Fig. 5;

Fig. 7 is an elevational view, partly in section, showing the H knife shown in Fig. 5 in operating relation to the platen roller, the knife and platen roller being shown in section;

Fig. 8 is a perspective elevational view of the knife for cutting the tape, this knife being mounted in a manner similar to the H knife shown in Figs. 5, 6 and 7;

Fig. 9 is an elevational view illustrating a portion of the knife and bed plate for cutting the strip into sheets;

Fig. 10 is a sectional elevation taken substantially on line 10—10 of Fig. 9, looking in the direction of the arrows;

Fig. 11 is a plan view of the strip of wrapping material showing the H cuts and the tape secured to the strip;

Fig. 12 is a plan view showing a wrapper sheet cut from the strip shown in Fig. 11 to the proper length for wrapping the article to be wrapped; and Fig. 13 is a perspective view illustrating the driving connections for the various operating parts of the machine, this view being taken looking toward the rear of the machine.

Figure 1:
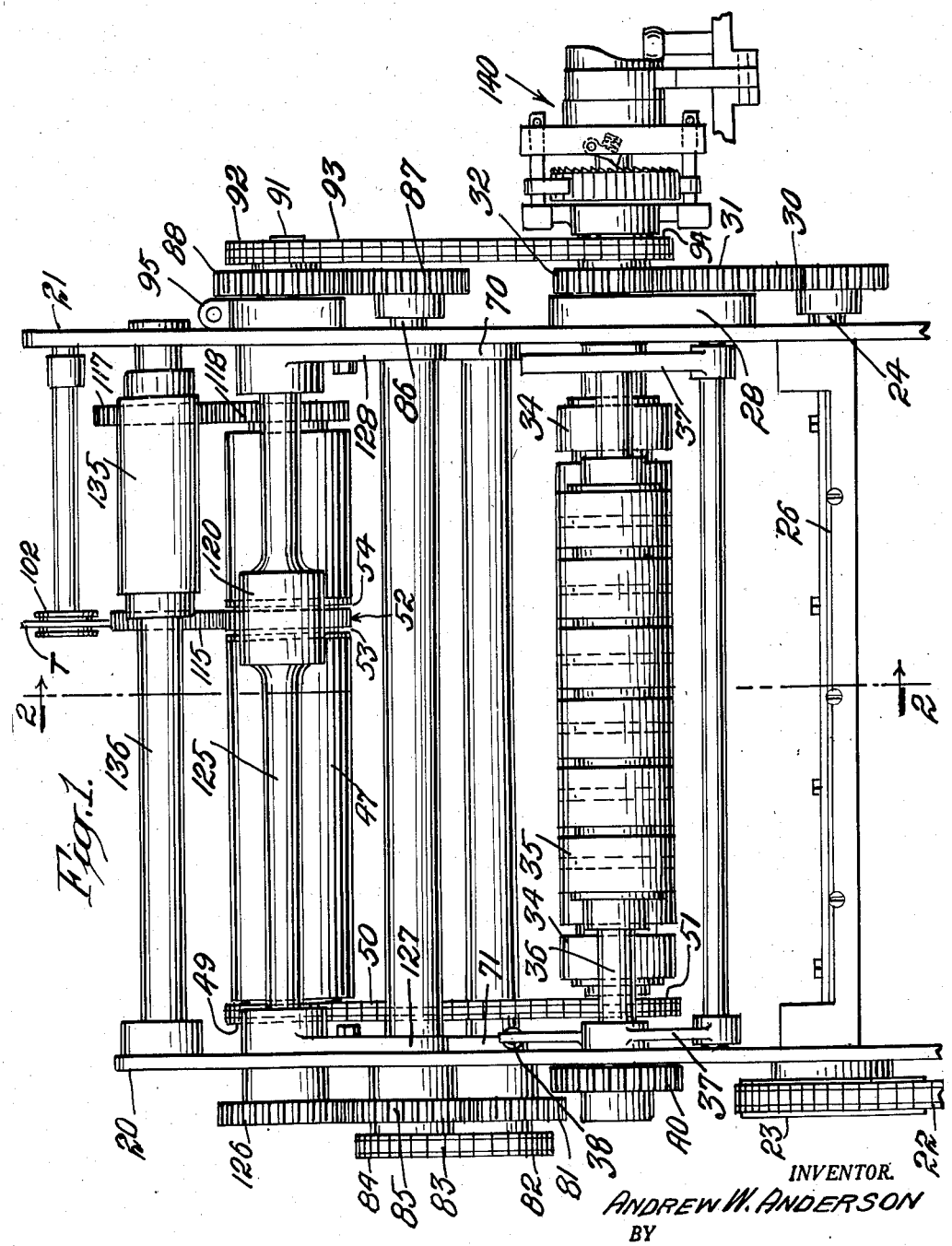
Figure 2:
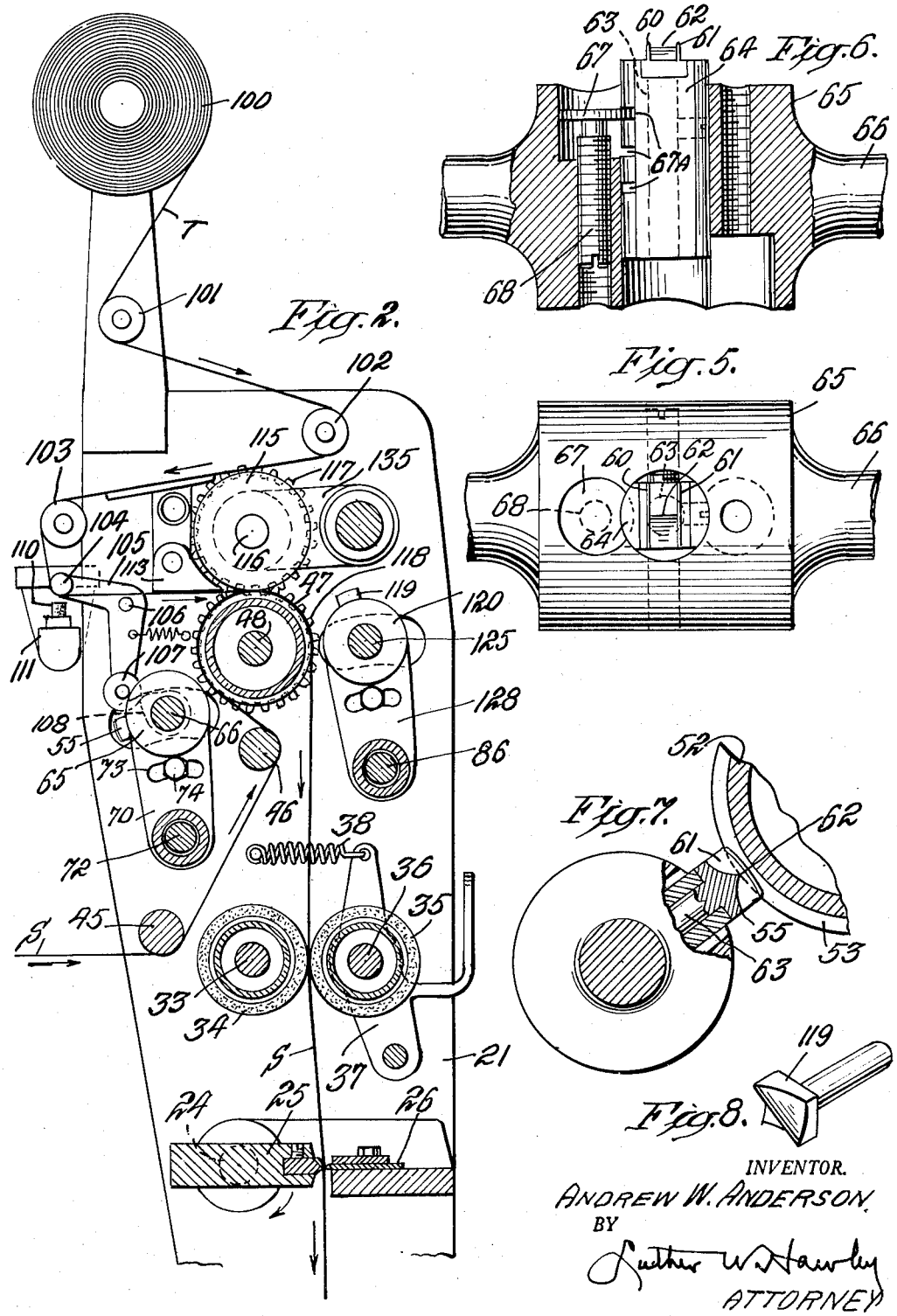
Fig. 2 is a vertical sectional elevation taken substantially on line 2—2 of Fig. 1, looking in the direction of the arrows.
Figure 3:
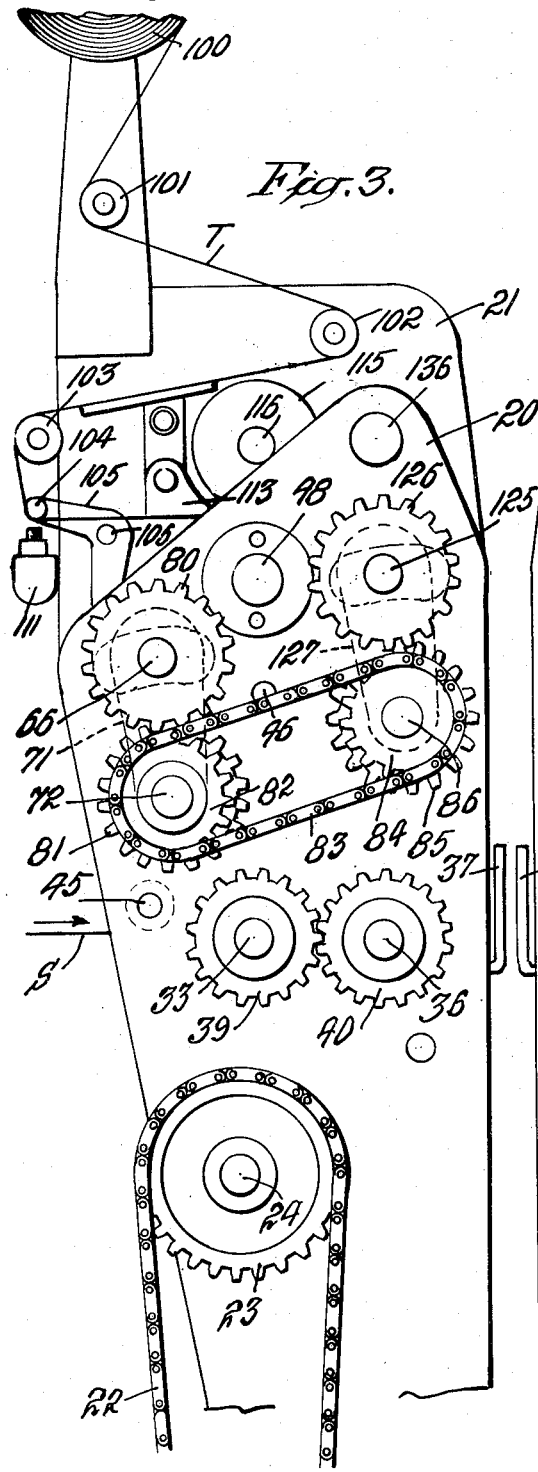
Fig. 3 is an end elevation of the left hand end of the machine, viewing Fig. 1, looking toward the right.
Figure 4:
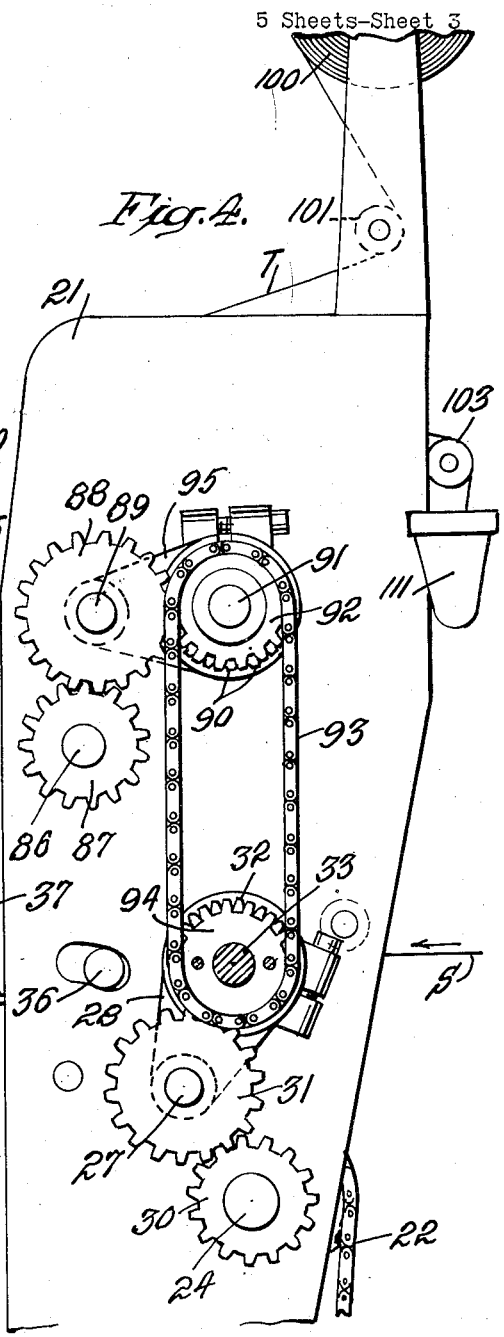
Fig. 4 is an elevational view of the right hand end of the machine, viewing Fig. 1, and looking toward the left, certain parts being omitted for the sake of clearness and parts being shown in section.

The feeding and cutting mechanism is mounted on a pair of upright supporting plates 20 and 21. The apparatus may be driven in any suitable manner and in the form of the invention illustrated the drive is taken from a chain 22, driven from any suitable source of power, and driving a sprocket 23 mounted on a shaft 24. The shaft 24, as will be later explained, carries a rotary knife 25 which coacts with a stationary knife 26 to cut the strip S into sheets of the proper length for wrapping operations.

The shaft 24 has secured to the other end thereof, a gear 30 which meshes with an idler gear 31, which in turn meshes with a gear 32 mounted on a shaft 33. Shaft 33 has mounted thereon a feed roller 34 which coacts with a roller 35 mounted on a shaft 36 to feed the sheet with the tape secured thereto downwardly or to draw the sheet downwardly to the sheet cutting mechanism above described. Shaft 36 is mounted in arms 37 which are pulled by springs 38 in a direction to force the roller 35 toward the roller 34 in order to firmly grip the sheet therebetween. Shaft 33 has mounted thereon a gear 39 which meshes with a gear 40 mounted on the shaft 36, thus insuring the synchronous rotation of the rollers.

The sheet S of wrapping material, such as cellophane, or any other desired paper material, is led into the machine from a supply roller around guide rollers 45 and 46 to a platen roller 47 mounted on a shaft 48. Shaft 48 has mounted thereon a sprocket 49 which is driven by a chain 50, the chain being driven from a sprocket 51 mounted on the shaft 33. The platen roller 47 has formed therein, in the outer surface thereof, a circumferential metal insert 52 and this insert has circumferential slits or grooves 53 and 54 which receive portions of the knife 55 which forms an H cut, as shown at 56 in the strip, as shown in Fig. 11.

The knife and the mounting therefor are shown particularly in Figs. 5, 6 and 7. As shown therein, the H knife 55 has a pair of spaced blades 60 and 61, between which there is formed a V-shaped cutting portion 62. The knife has a rearwardly extending post 63 which is mounted in a slidable cylindrical support 64, the support being slidable in mounting or hub 65 carried by or formed on a shaft 66. The knife support 64 is radially movable in the hub or mounting 65 in the following manner. The hub or knife mounting 65 has threaded therein a screw 68 which has on its inner end a disk 67. Disk 67 is seated in one of a plurality of notches 67A in the knife support 64. As the screw 68 is turned in one direction or the other, the knife will be moved radially in the hub 65. As the knife is adjusted radially in the manner described toward or away from the platen roller 47, the shaft 66 will be adjusted toward or away from the axis of the roller 47. This is done in the following manner.

The shaft 66 is mounted in a pair of arms 70 and 71 which are pivoted on a spindle 72. The arms 70 and 71 have arcuate slots 73, the arcs being formed on the axis of the shaft 72 as a pivot, and through each of these slots there extends a bolt 74 which will clamp its respective arm 70 or 71 in adjusted position, the arm being clamped against the side plates 20 or 21. The side plates 20 and 21 are slotted to permit lateral movement of the shaft 66 and shaft 125 hereinafter described.

The purpose of adjusting the knives radially in the knife supporting hubs is to vary the circumferential path of travel of the knife and thereby vary the spacing of the H cuts in the strip of wrapping material. In this manner sheets of different lengths may be cut from the strip. As will be hereinafter explained, means is provided for varying the rate of rotation of the feed rolls which draw the strip through the machine and as the speed of rotation of the feed rolls is varied, a corresponding adjustment must be made in the spacing of the H cuts in the strip and in the tape cutting knife. This will be more fully outlined when the feed roll speed changing mechanism is explained.

The shaft 66 is driven in the following manner. Shaft 66 has mounted thereon a gear 80 which meshes with a gear 81 rotatably mounted on the spindle 72. The hub of the gear 81 has secured thereto a sprocket wheel 82 which meshes with a chain 83, which also meshes with a sprocket wheel 84 which is fixed to a gear 85 mounted on a shaft 86. Shaft 86 has also secured thereto a gear 87 which meshes with a gear 88 mounted on a stud shaft 89. Gear 88 meshes with a gear 90 carried by the stud shaft 91. Gear 90 is secured through a sprocket wheel 92 which is driven by a chain 93, which in turn is driven by a sprocket wheel 94 carried by the shaft 33, on which the feed roll 34 is mounted.

As shown in Figs. 11 and 12, a tear tape T is secured to the strip S at spaced intervals thereon. The tear tape is carried by a supply roll 100 and is led around guide rollers 101, 102 and 103 to a roller 104 mounted on a bell crank lever 105, which in turn is mounted on a fixed pivot 106. The bell crank lever has secured to the other end thereof, a roller 107 which engages a cam 108 mounted on the shaft 66. The tear tape T is led beneath the roller 104 and then substantially horizontally to the upper surface of the strip S which is in contact with the outer surface of the platen roller 47.

Beneath the roller 104 is mounted a wick 110 which extends into a reservoir 111 of suitable adhesive material or solvent. The roller 104 is lowered by the cam to engage the wick as it passes around the roller 104, but this engagement is interrupted by the action of the cam in order to prevent the extending portion of the tear tape, as shown at 112 in Fig. 12, from receiving solvent or adhesive. After the tear tape leaves the roller 104, it passes beneath the heater 113 to render it tacky.

From the foregoing description it will be seen that the H cuts 56 have been formed in the strip before the tear tape is pressed against and secured to the upper surface of the strip S by a roller 115. Roller 115 is mounted on a spindle 116 driven by a gear 117 which meshes with a gear 118 carried by the shaft 48.

The tape cutter 119 is shown in Fig. 8 and since this knife or cutter is mounted in its knife support 120 in the same manner as the H knife mounting 64, details of the mounting of the tape knife 119 have not been illustrated and will not be described.

The tape knife mounting or hub 120 is carried by a shaft 125, to which is secured a gear 126 driven by the gear 85 mounted on the shaft 86. The shaft 125 is mounted in arms 127 and 128 pivoted on shaft 86 and these arms are adjusted in the same manner as the arms 70 and 71 to move the tape knife shaft 125 toward or away from the axis of the platen roller 47.

In order to facilitate the insertion of the tape between the roller 115 and the platen roller 47, the shaft 116 of the roller 115 is mounted in an arm 135 pivoted on stud shaft 136 carried by the side plates 20 and 21.

In order to adapt the machine for cutting sheets to wrap various sizes of packages, provision is made for changing the speed of rotation of the feed rollers. This is accomplished by changing the gear 30 on the shaft 24. When this gear is changed the gear 87 on the shaft 86 is also correspondingly changed and replaced by a gear having the same number of teeth as the gear substituted for the gear 30. This maintains the same ratio or time relation between the knife shaft 24 and the knife shafts 66 and 125 on which the H knife and the tape knife are mounted.

However, in order to synchronize the speed of operation of the H knife and the tape knife, these knives are radially adjusted in their mountings or hubs to change the peripheral path of the knives.

In order to provide for the change in sizes of the gear 30 and the gear 87, the gear 31 which meshes with the gear 30 and is mounted on the shaft 27 is carried by an arm 28 pivoted on shaft 33 and gear 88 and shaft 89 are mounted on arms 95 pivoted on shaft 91.

It will be understood from the foregoing description that the lengths of the sheets severed from the strip can be varied and corresponding changes in the lengths of the tapes secured to the individual sheets can be made. From the showing in Figs. 9 to 12 inclusive it will be noted that the stationary knife 26 has an arcuate recess 26A so that when the strip is cut into sheets the knife will straddle the tape and the tape will not be cut at the same time.

In Fig. 1 there is shown at the right, compensating mechanism 140, by means of which the feed rolls can be adjusted to properly position the strip and sheet, but since this forms no part of the present invention detailed illustration and description of this apparatus is omitted.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Strip feeding and cutting mechanism comprising a platen roll, means for feeding a strip to said roll, means for adjusting said feeding means to vary the rate of speed of the strip feed, means for feeding a tear tape to said roll and for securing said tape to one surface of the strip, a rotary member, a cutter radially mounted in said member and engageable with the strip to place a series of longitudinally spaced slits in the strip after the strip has engaged the roll but before the tape has contacted the strip, said cutter being radially adjustable in said member, and the axis of said rotary member being movable toward and away from the platen roll, a second rotary member, a cutter radially mounted thereon, said cutter being engageable with said tear tape, said cutter being radially adjustable on said rotary member, and the axis of said rotary member being adjustable toward and away from said platen roll.

2. Strip feeding and cutting mechanism comprising strip feeding rolls, means for varying the rate of rotation of said feeding rolls to vary the rate of speed of the strip feed, a platen roll, means for guiding a paper strip and tear tape to said roll in juxtaposed relation and securing the tape to one surface of the strip, rotary knives engageable respectively with said strip and tape as they engage the platen roll, and means to vary the peripheral speed of the knives to correspond to changes in speed of the feed rolls.

References Cited in the file of this patent

UNITED STATES PATENTS

| | | |
|---|---|---|
| 2,179,464 | Avery | Nov. 7, 1939 |
| 2,360,845 | Bronander | Oct. 24, 1944 |